(12) United States Patent
Huang et al.

(10) Patent No.: US 11,169,108 B2
(45) Date of Patent: Nov. 9, 2021

(54) MULTIPLE-CHANNEL BIOSENSOR TEST STRIP

(71) Applicant: Guo Hoong Industry Co., Ltd, New Taipei (TW)

(72) Inventors: Kuo-Tsai Huang, New Taipei (TW); Kuo-Chung Chang, New Taipei (TW)

(73) Assignee: GUO HOONG INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 16/841,471

(22) Filed: Apr. 6, 2020

(65) Prior Publication Data

US 2020/0393401 A1 Dec. 17, 2020

(30) Foreign Application Priority Data

Jun. 12, 2019 (TW) ................. 108120308

(51) Int. Cl.
*G01N 27/327* (2006.01)
*G01N 27/27* (2006.01)

(52) U.S. Cl.
CPC ......... *G01N 27/3272* (2013.01); *G01N 27/27* (2013.01)

(58) Field of Classification Search
CPC .... G01N 27/27; G01N 27/3272; G01N 27/40; G01N 27/48; G01N 27/26; G01N 27/10; G01N 27/06; G01N 33/49; G01N 33/80; G01N 33/26; C12Q 1/00; C12Q 1/02; C12Q 1/006; C12Q 1/34; C12Q 1/54
See application file for complete search history.

(56) References Cited

U.S. PATENT DOCUMENTS

| | | | | |
|---|---|---|---|---|
| 4,515,889 A | * | 5/1985 | Klose ....................... | C12Q 1/00 435/4 |
| 5,075,077 A | * | 12/1991 | Durley, III .............. | B01L 3/545 422/424 |
| 7,108,774 B1 | * | 9/2006 | Laitinen-Vellonen ...................... | G01N 27/27 204/406 |

* cited by examiner

*Primary Examiner* — Gurpreet Kaur
(74) *Attorney, Agent, or Firm* — Chun-Ming Shih; HDLS IPR Services

(57) ABSTRACT

A biosensor test strip includes a substrate having a read section and a detection section. A surface of the detection section is formed with a protrusion seat and detection channels. The protrusion seat is provided with a notch and grooves located higher than the detection channels, and the grooves are connected to the detection channels correspondingly; in addition, detection reagents are arranged in the detection channels. A lid covers the detection channels and exposes the notch of the protrusion seat to ensure the detection results of each detection channel.

10 Claims, 11 Drawing Sheets

MULTIPLE-CHANNEL BIOSENSOR TEST STRIP

BACKGROUND OF THE INVENTION

Field of the Invention

The present invention generally relates to biosensor devices, and more particular to a biosensor test strip.

Description of Prior Art

A biosensor detection device is used to obtain physiological information of an analyte as a reference basis for analyzing the analyte. At present, a biosensor test strip is usually provided with a detection opening and a detection channel on a plastic plate; therefore, an analyte is dropped into the detection opening and flows into the detection channel for detecting and obtaining relevant data.

A traditional biosensor test strip is provided with one single detection channel to obtain only one kind of test data. Therefore, when multiple test data are required to be obtained, analyte must be collected multiple times. This will not only increase the test time but also waste multiple test strips. In addition, currently biosensor test strips are already provided with multiple detection channels. However, the distance between detection channels of the aforementioned biosensor test strips is small; besides, there is no height difference between the detection inlet and the detection channels. Thus, in the process of detection, the condition of overflow or counterflow might be happened easily as long as the biosensor test strip is shaken dynamically or placed in a non-horizontal condition. As a result, the analyte in each of detection channels may be mixed or connected; thus, the currents are conducted with each other, and the test result is affected.

In view of the above drawbacks, the Inventor proposes the present invention based on his expert knowledge and elaborate researches in order to solve the problems of prior art.

SUMMARY OF THE INVENTION

Accordingly, an object of the present invention is to provide a multiple-channel biosensor test strip, wherein multiple test items can be detected simultaneously through a small amount (one drop) of an analyte, and the analyte in each detection flow channel can be prevented from being mixed and the currents of the detection channels will not be conducted; therefore, the detection results of each detection channel can be ensured.

In order to achieve the object mentioned above, the present invention provides a multiple-channel biosensor test strip including a substrate, a circuit layer, a plurality of detection reagents, and a lid. The substrate includes a read section and a detection section, wherein the substrate is formed with a protrusion seat and a plurality of detection channels disposed on a surface of the detection section. The protrusion seat is provided with a notch higher than the detection channels and a plurality of grooves communicated with the notch, wherein the grooves are connected to the detection channels correspondingly. The circuit layer is disposed on the substrate, wherein the circuit layer includes a plurality of metal circuits and a plurality of electrodes disposed on the metal circuits. The metal circuits extend from the read section to the detection section, and the electrodes are exposed in the detection channels of the detection section. The detection reagents are arranged in the detection channels and covers the electrodes. The lid is combined on the detection section, wherein the lid covers the detection channels and exposes the notch of the protrusion seat.

Comparing to the prior art, the substrate of the multiple-channel biosensor test strip of the present invention is provided a protrusion seat and a plurality of detection channels to facilitate performing multiple tests at the same time. In addition, since the protrusion seat is provided with a notch and a plurality of grooves higher than the detection channels, the analyte can flow into the detection channels smoothly without external power. Furthermore, the disposition of the grooves has characteristics of buffer to be used as holding tanks for accommodating analyte and air bubbles that may be occurred. The analyte flows along the grooves of the protrusion seat and enters the detection channels evenly after the analyte is dropped into the notch. Moreover, after the lid covers thereon, the analyte flows and is attached to the detection reagent due to capillary and siphon phenomenon of the detection channels. Thereby, the analyte in adjacent detection channels will not be mixed due to overflow, and currents of the detection channels will not be conducted and interfered with each other; therefore, the detection result of each detection channel can be ensured.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
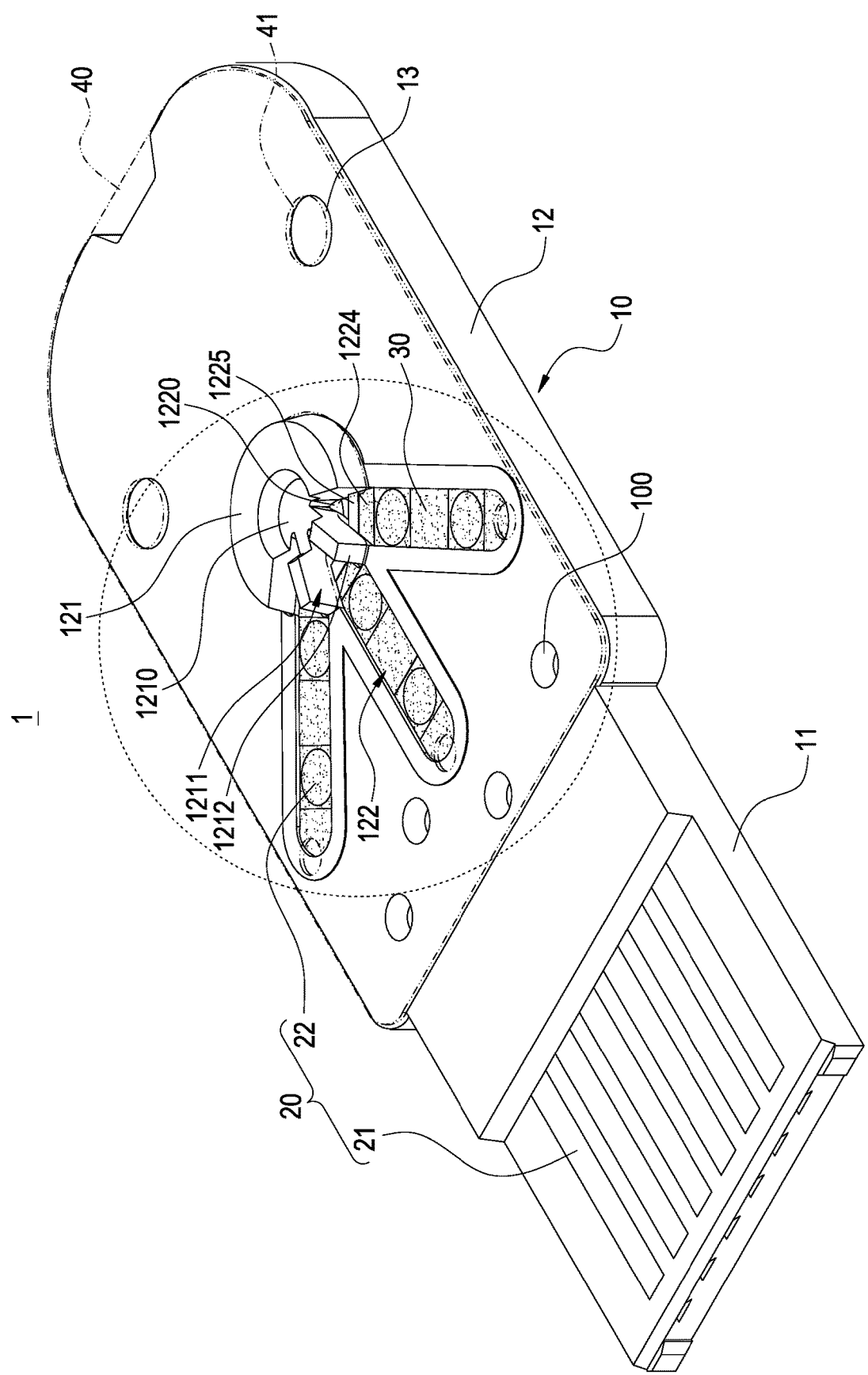
FIG. 1 is a perspective schematic view of the multiple-channel biosensor test strip of the present invention.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 4, which depict a perspective schematic view of the multiple-channel biosensor test strip of the present invention, a partially enlarged schematic view of the multiple-channel biosensor test strip of the present invention, a combination schematic view of the lid of the present invention, and a perspective schematic view of the circuit layer of the present invention. The present invention is a multiple-channel biosensor test strip 1 including a substrate 10, a circuit layer 20, a plurality of detection reagents 30, and a lid 40. The substrate 10 is combined with the circuit layer 20 by integral injection molding. The detection reagents 30 are disposed on electrodes 22. The lid 40 is combined with the substrate 10 for covering the detection reagents 30 to constitute the multiple-channel biosensor test strip 1. The multiple-channel biosensor test strip 1 is described in more detail as follows.

Figure 2:
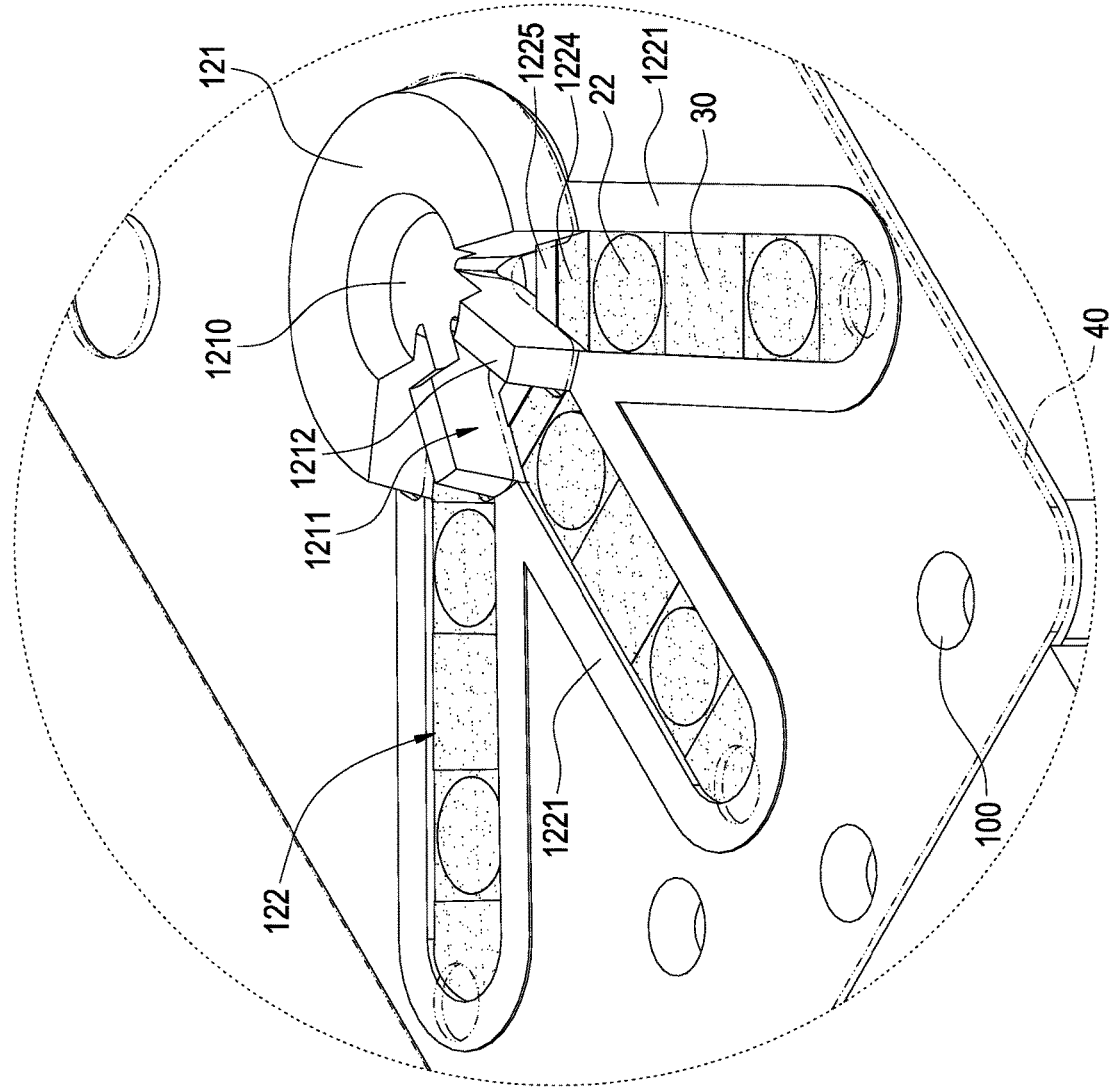
FIG. 2 is a partially enlarged schematic view of FIG. 1.
Figure 3:
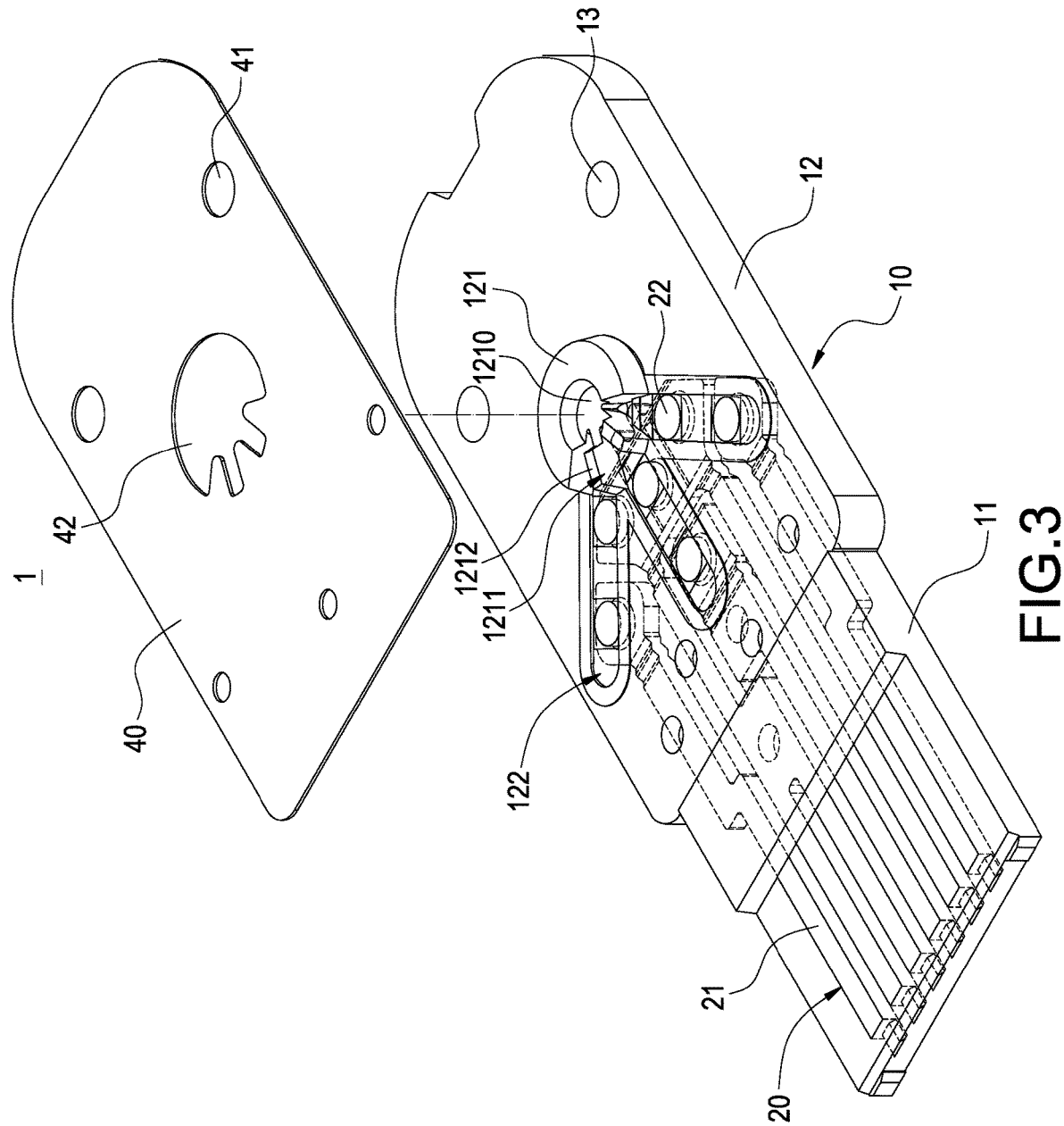
FIG. 3 is a combination schematic view of the lid of the present invention.

As shown in FIG. 1 and FIG. 2, the substrate 10 includes a read section 11 and a detection section 12, and the substrate 10 is formed with a protrusion seat 121 and a plurality of detection channels 122 on a surface of the detection section 12. The protrusion seat 121 is provided with a notch 1210 located higher than the detection channels 122 and a plurality of grooves 1211 communicated with the notch 1210. The grooves 1211 are connected to the detection channels 122 separately. For example, the substrate 10 can be made from plastic of polybutylene terephthalate (PBT) mixed with 20% glass fiber (FB) by integral injection molding to increase the precision of the substrate 10, which improves the yield rate and reduce costs.

Specifically, the detection channels are arranged radially on an outer periphery of the projection seat 121. In addition, the detection channels 122 are straight to facilitate the analyte flowing smoothly in the detection channels 122 without being blocked. Preferably, the protrusion seat 121 is provided with a partition block 1212 higher than a bottom of the notch 1210 between each of the grooves 1211. One end of the partition block 1212 is connected to the notch 1210 and another end is extended between adjacent detection channels 122 to avoid overflow and mixing of analytes in the adjacent detection channels 122.

In the present embodiment, each of the detection channels 122 is a U-shaped groove. The left and right inner sides of the U-shaped grooves are provided with hydrophilic capillary structures (not shown) such as rough surfaces in a micron-level, and the disposition of the hydrophilic capillary structures has benefit for the flowing of the analyte. In addition, a flange 1221 is formed on the periphery of each of the detection channels 122, and the flange 1221 is higher than a surface of the detection section 12 to prevent overflow of the analyte in the detection channel 122. Furthermore, the surface of the flange 1221 is smooth and coated with a glue layer (not shown) for bonding the lid 40.

It is worthy of noticing that the substrate 10 is formed with a plurality of circuit position holes 100. The circuit position holes 100 are used as pressing points in the injection molding process to facilitate positioning of the circuit layer 20.

Figure 4:
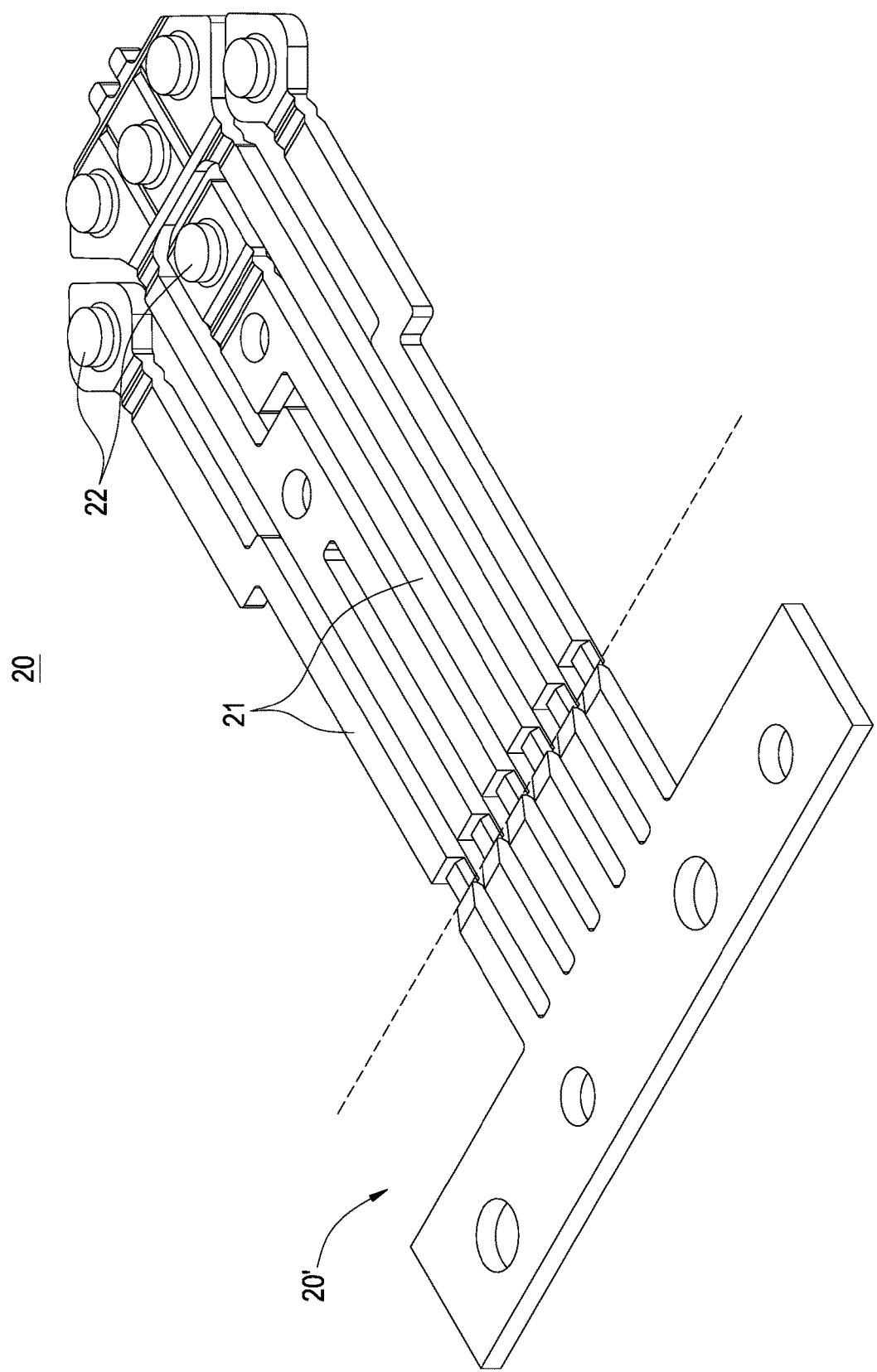
FIG. 4 is a perspective schematic view of the circuit layer of the present invention.

Please refer to FIG. 4. The circuit layer 20 is disposed on the substrate 10. The circuit layer 20 includes a plurality of metal circuits 21 and a plurality of electrodes disposed 22 on the metal circuits 21. In one embodiment of the present invention, the quantity of the metal circuits 21 and the electrodes 22 is six; the electrodes 22 are configured in a cylindrical shape separately. However, in real practice, the quantity and shape of the metal circuits 21 and the electrodes 22 are not limited thereto and can be adjusted according to actual conditions.

Moreover, the metal circuits 21 extend from the read section 11 to the detection section 12 of the substrate 10, and the electrodes 22 are exposed in the detection channels 122 of the detection section 12, wherein the metal circuits 21 are manufactured and processed through punch, extrusion, and press to increase accuracy and bonding area of products; therefore, the binding force therebetween is increased and the leakage of the detection reagent 30 during manufacturing process can be prevented.

In the present embodiment, the circuit layer 20 is made of brass or other precious metals. In addition, the metal circuits 21 are provided with nickel electroplating, and the electrodes 22 are also subjected to other processes. For instance, the surfaces of the electrodes 22 is processed with nickel electroplating, or the outer layer of nickel electroplating is processed by gold plating or carbon coating.

The detection reagents 30 are arranged in the detection channels 122 and cover the electrodes 22. In real practice, the detection reagents 30 are disposed in the detection channels 122 in a solid crystalline state, and types of the detection reagents 30 are disposed according to the detection items. It should be noted that the detection channels 122 are provided with rough surfaces before the detection reagents 30 are arranged thereon; thus, the adhesion to the detection reagents 30 is enhanced through the rough surfaces.

The lid 40 is combined on the detection section 12 of the substrate 10. The lid 40 covers the detection channels 122 and exposes the notch 1210 of the protrusion seat 121. Thereby, the analyte which is dropped into the notch 121 can flow into the detection channels 122 to avoid overflow from the detection channels 122.

In more detail, the lid 40 can be a transparent film to facilitate the observation of the analyte flowing into the detection channels 122. In addition, in an embodiment of the present invention, the detection section 12 of the substrate 10 includes a plurality of first position portions 13. The lid 40 has a plurality of second position portions 41 on a side facing the substrate 10. The substrate 10 and the lid 40 are combined through the engaging of the first position portions 13 and the second position portions 41. In addition, the lid 40 is provided with a hollow portion 42 corresponding to the location of the protrusion seat 121. The lid 40 is provided with a hydrophilic film (not shown) having a hydrophilic functional group substance and disposed on the surface facing the detection channels 122 to assist the flowing of the analyte.

It is worthy of noticing that because surfaces of the notch 1210, the grooves 1211, and inner sides of the U-shaped grooves are provided with hydrophilic capillary structures such as rough surfaces in a micron-level and the lid 40 is provided with a hydrophilic film, the analyte 3 can quickly flow into the detection channels 122. Thus, the arrangement of the hydrophilic structures has benefit for the flowing of the analyte to perform detection.

Please refer to FIG. 4. Another thing to be noted is that the circuit layer 20 of the present invention is provided in a strip type and has a strip connection section 20' to facilitate processing and manufacturing of multiple circuit layers 20 at the same time, so that the cost of production can be reduced and the yield rate is improved, and the circuit layer 20 and the substrate 10 are combined by integral injection molding. Therefore, the strip connecting section 20' of the circuit layer 20 does not need to be removed in advance to perform integral injection molding with the substrate 10. In addition, the quantity of the detection channels 122 of the present invention is designed according to actual use conditions in cooperation with the circuit layer 20, and the lid 40 needs to be designed correspondingly.

Figure 5:
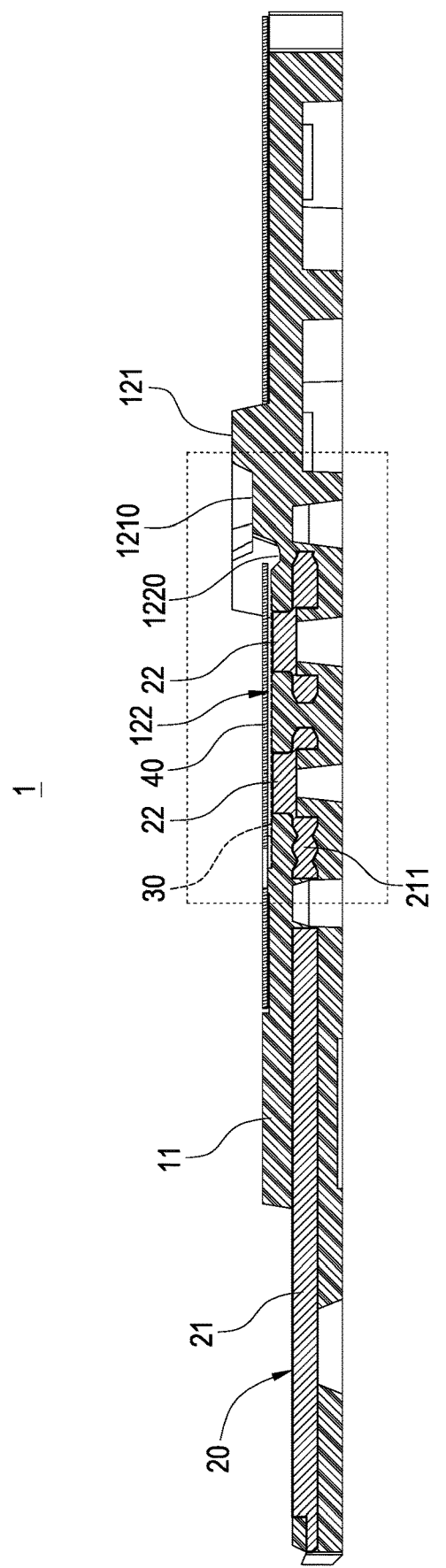
FIG. 5 is a cross sectional view of the multiple-channel biosensor test strip of the present invention.
Figure 6:
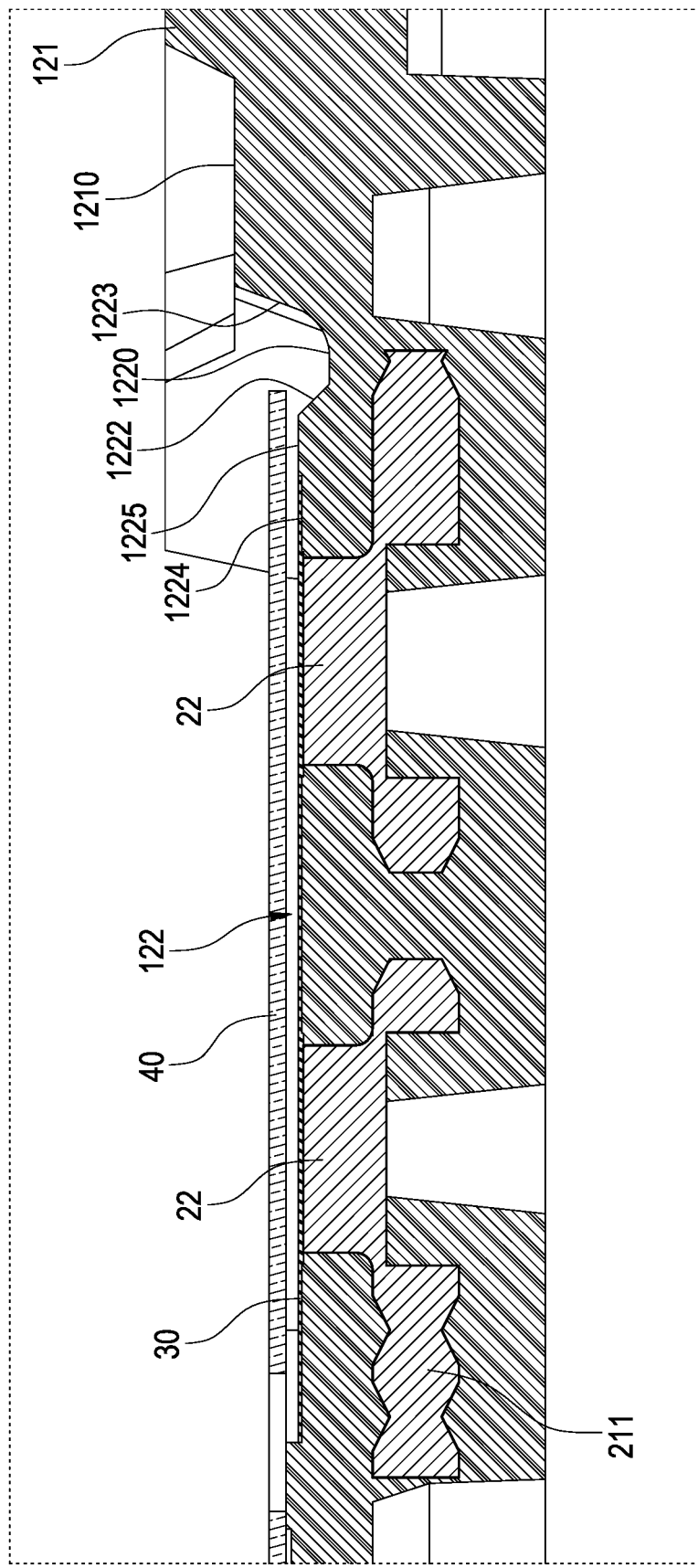
FIG. 6 is a partially enlarged schematic view of the multiple-channel biosensor test strip of the present invention.

Please further refer to FIG. 5 and FIG. 6, which depict a cross sectional view of the multiple-channel biosensor test strip of the present invention, and a partially enlarged schematic view of the multiple-channel biosensor test strip of the present invention. In the present, the notch 1210 is communicated with the detection channels 122, and each of the detection channels 122 is formed with a holding tank 1220 lower than a bottom surface of the notch 1210 and located at a side communicated with the notch 1210.

As shown in FIG. 6. The holding tank 1220 is connected to the detection channel 122 by a first inclined plane 1222 and connected to the notch 1210 by a second inclined plane 1223. In addition, please also refer to FIG. 2. In the present embodiment, each of the detection channels 122 is formed with a first protrusion surface 1224 and a second protrusion surface 1225 configured in a stepped shape separately on a side connected to the holding tank 1220. The first protrusion surface 1224 is provided with the detection reagent 30 slightly higher than surfaces of the electrodes 22 to ensure that the analyte can pass through the electrodes 22. Furthermore, the second protrusion surface 1225 is higher than the first protrusion surface 1224 to prevent the detection reagent 30 from overflowing during the process of dropping into the detection channels 122.

Figure 7:
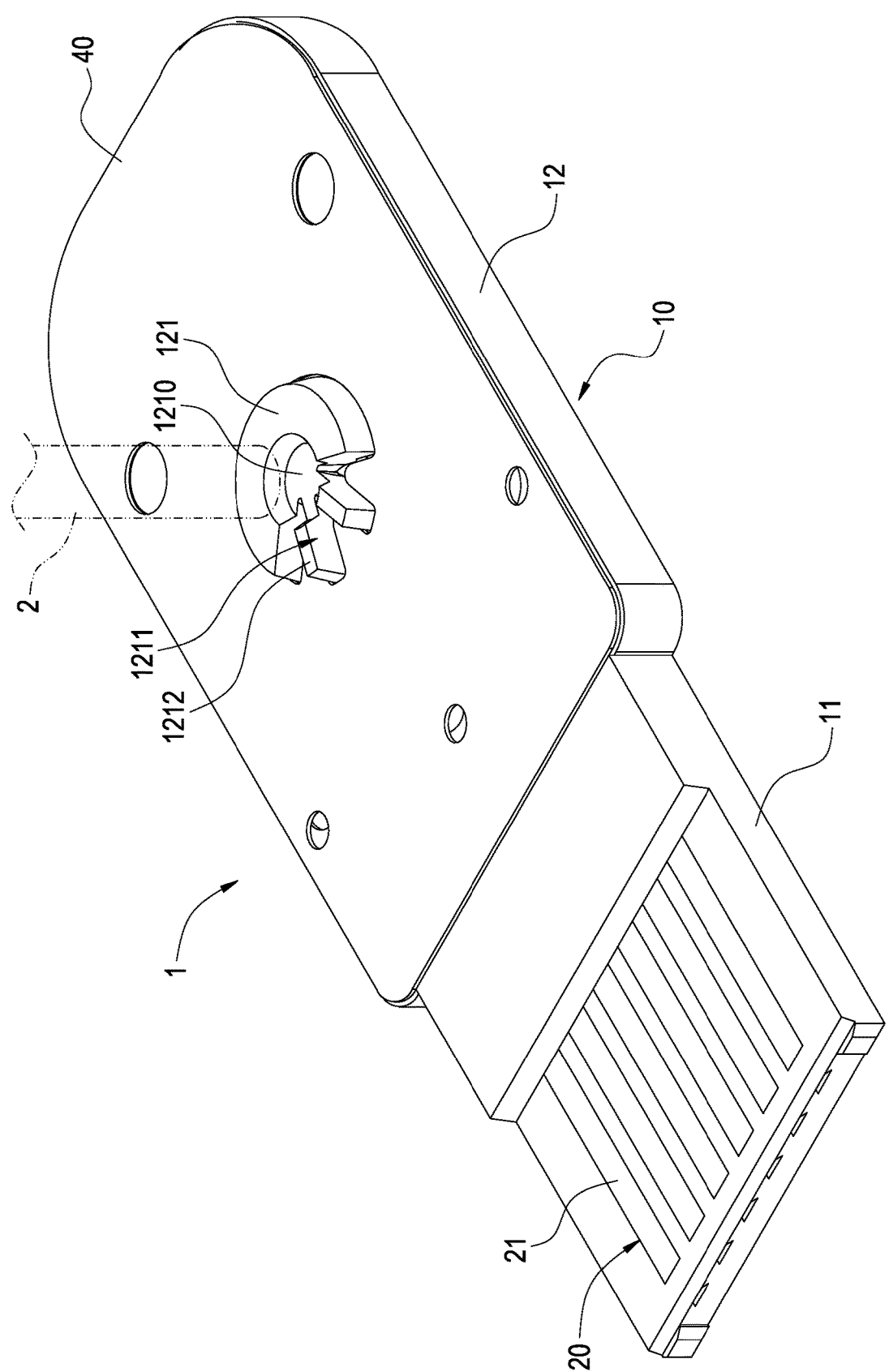
FIG. 7 is a schematic view of dropping analyte into the multiple-channel biosensor test strip of the present invention.
Figure 8:
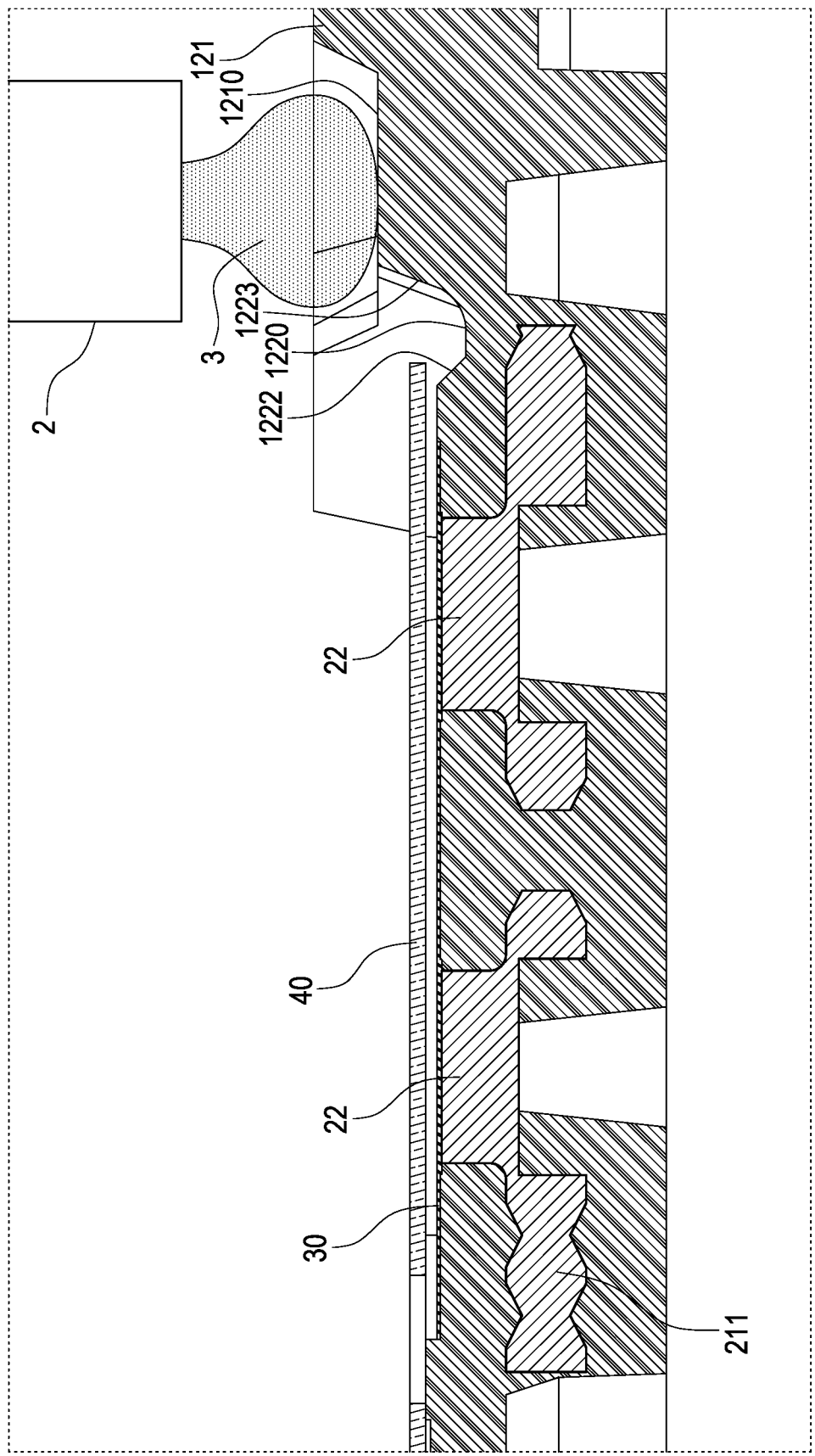
FIG. 8 is a cross sectional view of dropping analyte into the multiple-channel biosensor test strip of the present invention.

Another thing to be noted is that in one embodiment of the present invention, the metal circuits 21 of the circuit layer 20 are formed with a plurality of wave segments 211 on one side of the electrodes 22, wherein the wave segments 211 are located below bottoms of the detection channels 122 to increase bonding areas of the metal circuits 21 and the substrate 10 to the detection reagent 30 from leaking Please refer to FIG. 7 to FIG. 9, which depict a schematic view of dropping analyte into the multiple-channel biosensor test strip of the present invention, a cross sectional view of dropping analyte into the multiple-channel biosensor test strip of the present invention, and a flow schematic view of analyte of the present invention. As shown in FIG. 7 and FIG. 8, when the multiple-channel biosensor detection test strip 1 of the present invention is used, firstly a capillary 2 is used to suck an analyte 3, and then the capillary 2 is moved above the protrusion seat 121 to let the analyte 3 drop into the notch 1210.

Figure 9:
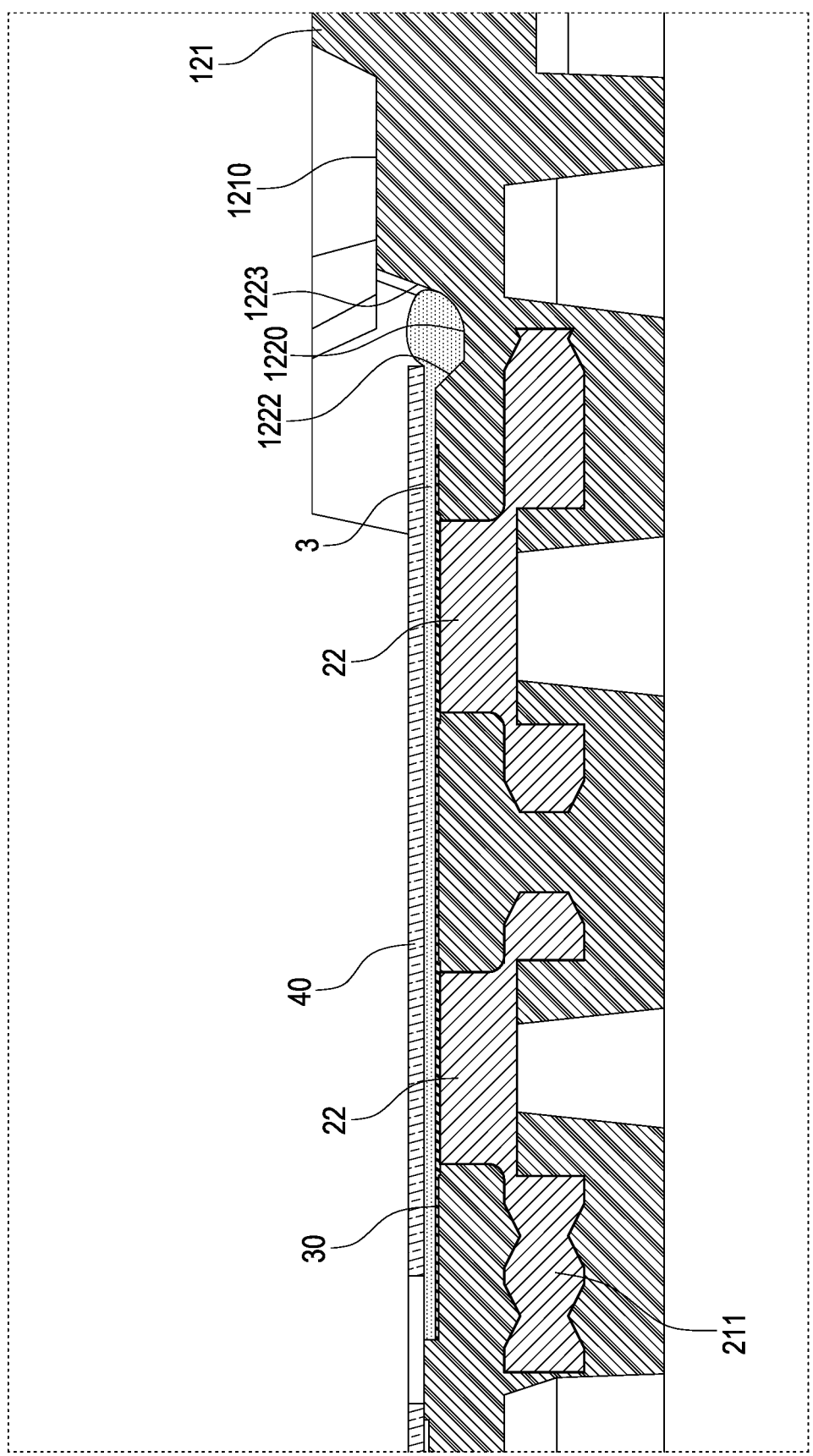
FIG. 9 is a flow schematic view of analyte of the present invention.

As shown in FIG. 9, the analyte 3 dropped in the notch 1210 follows along the grooves 1211 of the protrusion seat 121 and are distributed to enter each of the detection channels 122 evenly. Subsequently, the analyte 3 reacts with the detection reagent 30 in the detection channels 122. Finally, the reaction results and data are transmitted to the metal circuits 21 through the electrodes 22 and then transmitted to the outside through the metal circuits 21.

It is worthy of noticing that in the present invention, the analyte 3 flows through the second inclined surface 1223 and falls into the holding tank 1220 to generate a pressure difference of potential energy. Then the analyte 3 flows into the detection channel 122 via the capillary and siphon phenomenon to react with the detection reagent 30. Moreover, since a height difference is existed between the holding tank 1220 and the groove 1210, the excess analyte 3 will stagnate in the holding tank 1220 without flowing back to the notch 1210. In addition, the recessed design of the holding tank 1220 can accommodate air bubbles that might be occurred. Therefore, air bubbles can be prevented from flowing into the detection channels 122. Thereby, a buffer effect can be achieved to avoid of mixed pollution caused by the backflow of the analyte 3 in each of the detection channels 122, and the currents of each flow channel can be prevented from conducting with each other.

Figure 10:
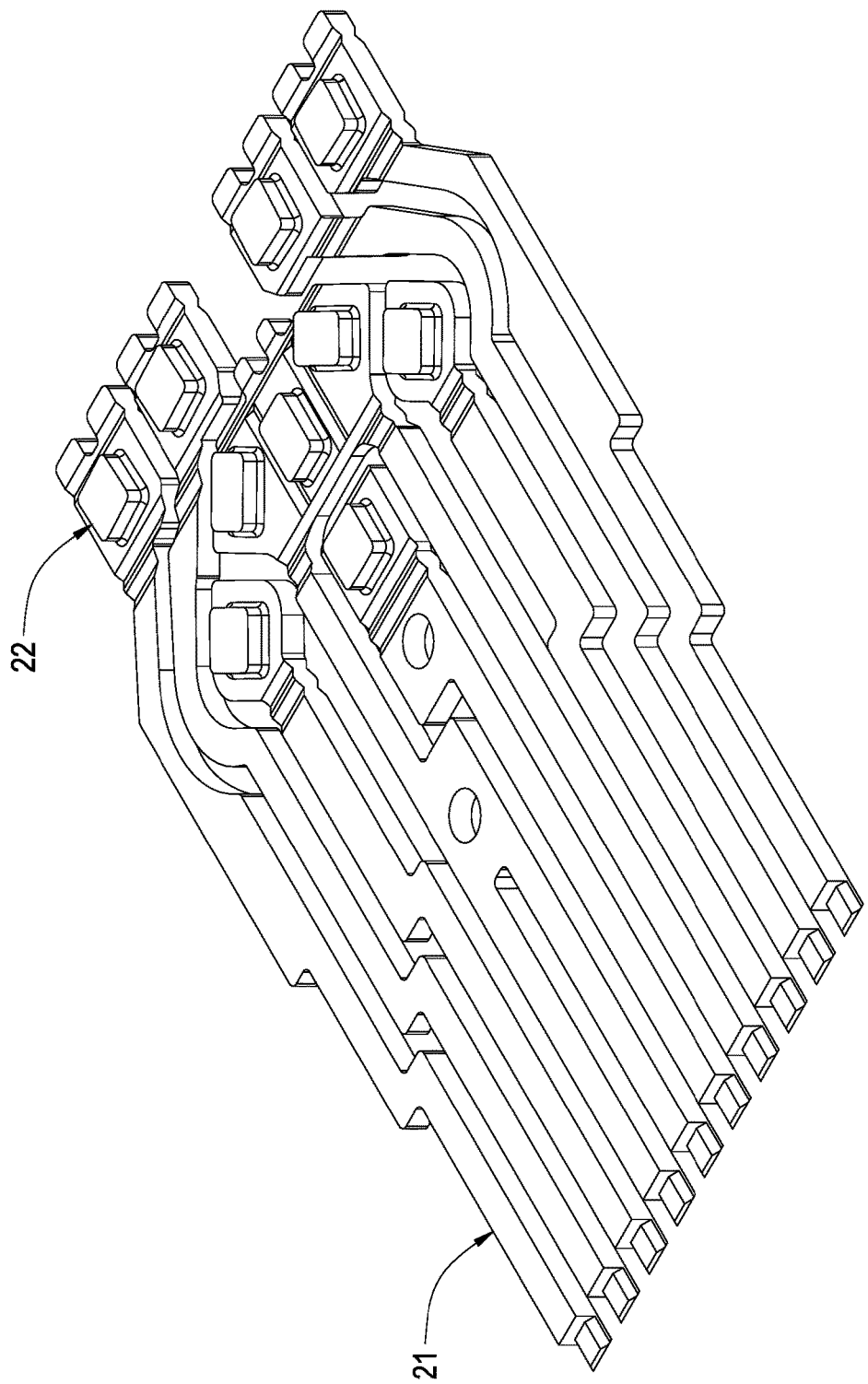
FIG. 10 is another embodiment of the circuit layer of the present invention.

Please further refer to FIG. 10, which depicts another embodiment of the circuit layer of the present invention. The present embodiment is substantially the same as the previous embodiment. The circuit layer 20 includes a plurality of metal circuits 21 and a plurality of electrodes disposed 22 on the metal circuits 21. The difference between the present embodiment and the previous embodiment is the quantity of metal currents 21 and types of electrodes 22. In the present embodiment, the amount of the metal circuits 21 and the electrodes 22 is ten, and the electrodes 22 are configured in a rectangular shape separately.

Figure 11:
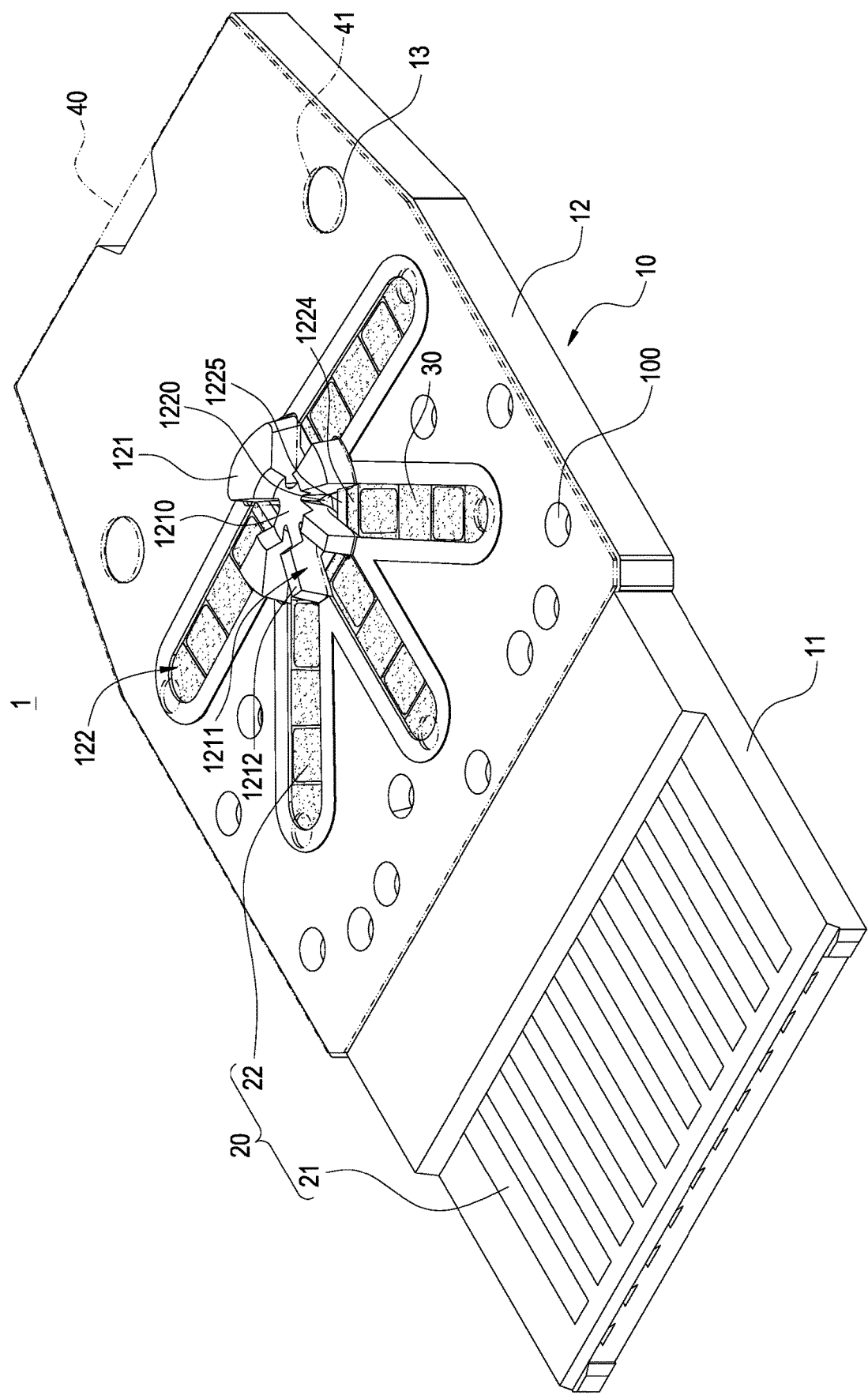
FIG. 11 is another embodiment of the multiple-channel biosensor test strip of the present invention.

Please also refer to FIG. 11, which depicts another embodiment of the multiple-channel biosensor test strip of the present invention. The present embodiment is substantially the same as the previous embodiment. The multiple-channel biosensor test strip 1 includes a substrate 10, a circuit layer 20, a plurality of detection reagents 30, and a lid 40. The substrate 10 is combined with the circuit layer 20 by integral injection molding. The main difference between this embodiment and the previous embodiment is the appearance of the circuit layer 20 (described above) and the substrate 10.

In the present embodiment, the substrate 10 is formed with a protrusion seat 121 and a plurality of detection channels 122, and the quantity of the detection channels 122 is five in accordance with the circuit layer 20.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A multiple-channel biosensor test strip, comprising:
   a substrate including a read section and a detection section, wherein the substrate is formed with a protrusion seat and a plurality of detection channels on a surface of the detection section; the protrusion seat is provided with a notch located higher than the plurality of detection channels and a plurality of grooves communicated with the notch; and the plurality of grooves are connected to the plurality of detection channels correspondingly;
   a circuit layer disposed on the substrate, wherein the circuit layer includes a plurality of metal circuits and a plurality of electrodes disposed on the plurality of metal circuits; the plurality of metal circuits extend from the read section to the detection section; and the plurality of electrodes are exposed in the plurality of detection channels of the detection section;
   a plurality of detection reagents arranged in the plurality of detection channels and covering the plurality of electrodes; and
   a lid combined on the detection section, wherein the lid covers the detection channels and exposes the notch of the protrusion seat.

2. The multiple-channel biosensor test strip according to claim 1, wherein the plurality of detection channels are arranged radially on an outer periphery of the protrusion seat.

3. The multiple-channel biosensor test strip according to claim 1, wherein the protrusion seat is provided with a partition block formed higher than a bottom of the notch and located between adjacent plurality of grooves, and one end of the partition block is connected to the notch and another end is extended to a location between adjacent plurality of detection channels.

4. The multiple-channel biosensor test strip according to claim 1, wherein surfaces of the notch and the grooves are provided with hydrophilic capillary structure.

5. The multiple-channel biosensor test strip according to claim 1, wherein the notch is communicated with the plurality of detection channels, and each of the plurality of detection channels is formed with a holding tank lowered than a bottom surface of the notch and located at a side communicated with the notch.

6. The multiple-channel biosensor test strip according to claim 5, wherein the holding tank is connected to the plurality of detection channel by a first inclined plane and connected to the notch by a second inclined plane.

7. The multiple-channel biosensor test strip according to claim 5, wherein each of the plurality of detection channels is formed with a first protrusion surface and a second protrusion surface configured in a stepped shape separately on a side connected to the holding tank, and the second protrusion surface is higher than the first protrusion surface.

8. The multiple-channel biosensor test strip according to claim 1, wherein each of the plurality of detection channels is of a U-shaped groove; a flange is formed on a periphery of each of the plurality of detection channels; and the flange is higher than a surface of the detection section.

9. The multiple-channel biosensor test strip according to claim 8, wherein a surface of the flange is coated with a glue layer for bonding the lid.

10. The multiple-channel biosensor test strip according to claim 1, wherein the metal circuits are formed with a plurality of wave segments on one side of the plurality of electrodes, and the plurality of wave segments are located at the bottoms of the plurality of detection channels.

* * * * *